Nov. 14, 1961 E. BERNSTEIN 3,009,040
FUSE LINK, PARTICULARLY FOR LIQUID-FILLED
CAPACITORS, AND METHOD OF MANUFACTURE
Filed Aug. 3, 1959
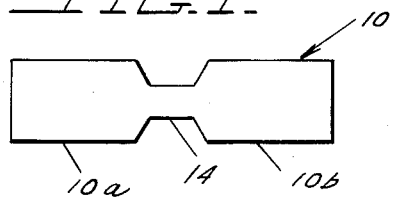
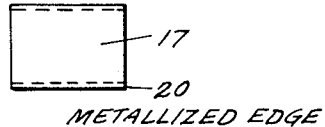
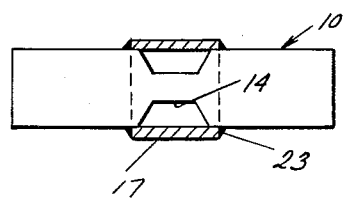
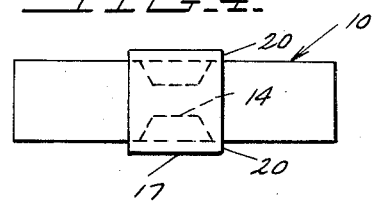
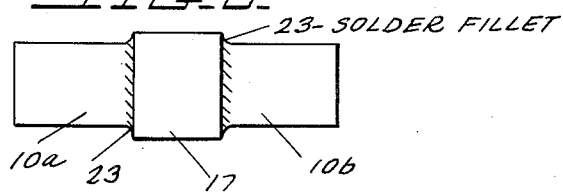
INVENTOR.
ELLIOT BERNSTEIN
BY
ATTORNEYS

3,009,040
FUSE LINK, PARTICULARLY FOR LIQUID-FILLED CAPACITORS, AND METHOD OF MANUFACTURE
Elliot Bernstein, 349 Madison Ave., Cedarhurst, N.Y.
Filed Aug. 3, 1959, Ser. No. 831,332
3 Claims. (Cl. 200—135)

This invention relates to fuses and more particularly to fuses for use in liquid-filled electrical devices, for example, liquid-filled capacitors.

A problem exists in the use of fuses in liquid-filled devices, especially capacitors, due to the cooling effect of the liquid. Specifically, where the liquid surrounds the fusing portion of a fuse link, the cooling effect is such that the fuse may not blow at rated current. This, of course, represents a source of danger.

Fuses of the type intended for liquid-filled capacitors find widespread use in connection with motors of air conditioning units wherein shorting of a capacitor will usually cause overheating and burning out of the motor. Since such motors are generally an integral part of a sealed compressor unit, which can be repaired only by the manufacturer, wherein a five-year guarantee for repair is involved, it will be appreciated that serious losses are entailed should a shorting capacitor effect motor burn-out. Hence, the importance of placing a reliable fuse within the capacitor and wired in series therewith.

Solutions to the problem of effecting reliability of a fuse to be used in the application described above have been heretofore proposed. For example, one such solution has been to sealingly coat a fuse link with an epoxy resin for the purpose of slowing down the cooling effect of the surrounding liquid of the capacitor. However, in many instances it has been found that the fuse may not be immersed, or may be only partially immersed in the capacitor liquid, and, therefore, the cooling effect of the liquid on the fuse suffers considerable variation which, of course, effects the blowing time of the fuse. Other solutions to the problem involve external fuses which are bulky and costly.

An object of the present invention is to solve the problem of safeguarding capacity motors by means of properly fused capacitors which can be relied upon to disrupt current within a practical overload range.

Another object of the invention is to provide a fuse which is small and compact and readily assembled within the interior of a liquid-filled capacitor.

A still further object of the invention is to provide a fuse which may be manufactured very simply and cheaply by presently known mass production methods, or methods readily adapted from known mass production methods.

In accomplishing the above objects, I provide a fuse comprising a simple strip of fusible material, for example, a copper-nickel alloy having a necked-down or a bridge area, which forms the fusible portion of the link. Sealingly surrounding the bridge portion is a flat, ceramic sleeve of steatite or the like, the ends or edges of which sleeve are hermetically sealed to the strip. Thus, the bridging portion and the tabs extending therefrom, together with the sleeve, form an integral unit wherein the bridging portion is completely sealed from access of air and liquid. In order to achieve such a construction, the ends or edges of the ceramic sleeve are metallized in any conventional manner, and the sleeve is slipped onto the fuse link strip so as to cover the bridge portion. Thereafter, each end of the strip, that is, each tab emerging from an end of the ceramic sleeve, is dipped into a molten metal, for example, a solder, after suitable, conventional fluxing. This deposits a solder coating on the tab which has the important effect of preventing contamination of the capacitor liquid by the metal of the tab, and also the effect of joining and fusing with the metallized ends of the sleeve. This joining effects a hermetic seal of the sleeve on the fuse strip which is impervious to air and liquid leakage. The joining also has the further effect of providing a fillet at the transition zone between the ends of the sleeve and the tabs effecting a smooth curvature of transition from the normally squared ends of the sleeve, thereby rendering the two elements more secure and rugged in physical combination and also reinforcing the sleeve and protecting its edges from shock and jar in handling.

A detailed description of the invention will now be given in conjunction with the appended drawing in which:

FIGURE 1 shows a strip of fusible material having a narrowed section, that is, a bridge, which is the fusible portion of the link.

FIGURE 2 shows a plan view of a ceramic sleeve which can be slidably telescoped over the fuse strip.

FIGURE 3 is an end view of the ceramic sleeve.

FIGURE 4 is an exterior plan view of the combined sleeve and strip prior to solder coating of the tabs.

FIGURE 5 is a plan view partially in section of the combined sleeve and strip subsequent to coating of the tabs; and FIGURE 6 is an exterior plan view of the finished product.

Referring now to the drawing the invention comprises a fuse link of fusible material such as strip 10 having tabs 10a and 10b and a narrowed or bridge fusing portion 14, in conjunction with a ceramic sleeve 17. The ends 20 of the sleeve are metallized in any suitable manner as indicated in FIGURE 3. As shown in FIGURE 4, the sleeve 17 is telescoped into position on the strip 10 so as to cover the bridge 14. A particular tight telescopic fit is not essential inasmuch as the edges of the sleeve are hermetically sealed to the tabs 10a and 10b in a manner to be described.

In order to effect such hermetic seal, the tabs are suitably fluxed in any conventional manner and thereafter each tab being held vertically, is dipped in turn into molten solder up to the respective edge 20 of the sleeve. Thus, a solder coating is formed on each tab, which solder coating joins with the metallized edges of the sleeve, and alloying therewith, forms completely sealed joints. The joints take the form of fillets 23 by virtue of surface tension of the molten metal, which fillets serve to securely position the sleeve on the strip bracing the sleeve against movement in either direction, as well as providing a smooth transition between the edges of the sleeve and the tabs 10a and 10b.

The final product is small, flat, compact, and rugged, and provides a fuse wherein the fusible portion is fully sealed against contact with any surrounding liquid. Further, the fuse link as disclosed herein is exceedingly simple and economical to manufacture by virtue of being composed essentially of two pieces; namely, a simple, flat fused strip having a cutout bridge portion and affording connecting tabs 10a and 10b, and a hermetically sealed sleeve thereon fully enclosing the bridge portion. Further, the molten metal coating for the tabs has the dual functions of effecting a hermetic seal, rigid positioning of the sleeve, and protection against contamination of the capacitor liquid due to contact with the metal of the tabs. Thus, while I have found solder to be quite effective for the coating, it will be appreciated that the invention is not limited to that particular metal. It will be appreciated that while I have found it feasible to effect the coating and the hermetic seal by a simple dipping of each tab in turn in molten solder, such coating could be applied in other ways; for example, by metal spraying.

Having thus described my invention, I am aware that various changes may be made without departing from the spirit thereof and, accordingly, I do not seek to be limited to the precise illustration herein given except as set forth in the limited claims.

I claim:

1. A fuse link for use in a liquid-filled device comprising a strip of fusible material having a fusing portion, a sleeve surrounding said portion, said link having tabs extending outwardly of the respective ends of said sleeve, said ends of said sleeve being hermetically sealed to said tabs, said sleeve being of ceramic material, means effecting sealing of said sleeve ends comprising a metallic solder coating on said tabs extending into contiguity with the ceramic material of said sleeve ends and hermetically sealed thereto.

2. A device as set forth in claim 1, said solder coating forming a fillet between said sleeve ends and respective tabs, said tabs extending beyond respective fillets for connection to apparatus.

3. A fuse link for use in a liquid-filled device such as a capacitor and the like, comprising a strip of fusible material having a narrowed, fusing portion, a ceramic sleeve surrounding said narrowed portion, said strip having tabs extending outwardly of respective ends of said sleeve, and a metal coating on each of said tabs extending into contiguity with said sleeve ends hermetically sealed to the ceramic material thereof and extending therebeyond for connection to apparatus.

References Cited in the file of this patent

UNITED STATES PATENTS

| | | |
|---|---|---|
| 2,282,849 | Beyer | May 12, 1942 |
| 2,302,820 | Van Liempt | Nov. 24, 1942 |
| 2,847,537 | Kozacka | Aug. 12, 1958 |
| 2,896,049 | Maier | July 29, 1959 |

FOREIGN PATENTS

| | | |
|---|---|---|
| 398,942 | Great Britain | Sept. 28, 1953 |